(12) United States Patent
Ganser

(10) Patent No.: US 6,655,003 B2
(45) Date of Patent: Dec. 2, 2003

(54) METHOD OF ASSEMBLING AN ELECTRIC MOTOR

(75) Inventor: Otmar Ganser, Kronberg (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/909,767

(22) Filed: Jul. 20, 2001

(65) Prior Publication Data

US 2002/0047327 A1 Apr. 25, 2002

Related U.S. Application Data

(62) Division of application No. 09/410,182, filed on Sep. 30, 1999, now abandoned.

(30) Foreign Application Priority Data

Oct. 5, 1998 (DE) .......................... 198 45 683

(51) Int. Cl.$^7$ .................. H02K 15/00; H02K 15/14; H02K 15/16
(52) U.S. Cl. ................ 29/596; 29/598; 29/732; 310/42; 310/89
(58) Field of Search ................ 29/596, 598, 732; 310/42, 89

(56) References Cited

U.S. PATENT DOCUMENTS

| | | | | |
|---|---|---|---|---|
| 3,755,889 A | * | 9/1973 | Busian .................. | 29/596 |
| 4,031,610 A | * | 6/1977 | Singh et al. ............ | 29/598 |
| 4,128,935 A | * | 12/1978 | Czech et al. ........... | 29/596 |
| 4,263,710 A | * | 4/1981 | Marracino et al. ...... | 29/596 |
| 4,361,953 A | * | 12/1982 | Peachee ................ | 29/596 |
| 4,590,668 A | * | 5/1986 | Peachee, Jr. .......... | 29/596 |
| 4,642,885 A | * | 2/1987 | King .................... | 29/596 |
| 4,862,581 A | * | 9/1989 | Royer .................. | 29/596 |
| 4,982,125 A | * | 1/1991 | Shirakawa ............. | 310/88 |
| 4,999,533 A | * | 3/1991 | King et al. ............ | 310/90 |
| 5,056,213 A | * | 10/1991 | Behnke et al. ......... | 29/596 |
| 5,117,138 A | * | 5/1992 | Trian .................. | 310/89 |
| 5,394,042 A | * | 2/1995 | Maestre ................ | 310/68 B |
| 5,646,467 A | * | 7/1997 | Floresta et al. ........ | 310/268 |
| 5,806,169 A | * | 9/1998 | Trago et al. .......... | 29/596 |
| 5,866,965 A | * | 2/1999 | Baronosky et al. ..... | 310/208 |
| 5,898,246 A | * | 4/1999 | Hoffman ............... | 310/60 R |
| 5,920,139 A | * | 7/1999 | Fujiwara et al. ....... | 310/154.11 |
| 5,977,671 A | * | 11/1999 | Kim .................... | 310/89 |
| 6,040,647 A | * | 3/2000 | Brown et al. ......... | 310/89 |

FOREIGN PATENT DOCUMENTS

| | | |
|---|---|---|
| DE | 2001179 | 7/1971 |
| DE | 2263546 | 7/1974 |
| DE | 2647031 | 4/1978 |
| DE | 3318921 | 11/1984 |
| GB | 2005925 | 4/1979 |
| GB | 2131629 | 6/1984 |

* cited by examiner

Primary Examiner—Peter Vo
Assistant Examiner—Paul D Kim
(74) Attorney, Agent, or Firm—Martin A. Farber

(57) ABSTRACT

A method for assembling an electric motor (10) having a stator (34) and a rotor (32). It is endeavored to keep the air gap (38) as narrow as possible, in order to achieve good efficiency of the motor (10). However, component tolerances and assembly errors require generous dimensioning in order to avoid possible contact between the stator (34) and the rotor (32). To improve the accuracy of assembly, is proposed, during the insertion into one another of the rotor (32) and the stator (34), a centering aid (40, 42) is introduced into the air gap (38) at at least three points, the rotor (32) and the stator (34) are subsequently fixed in relation to one another and finally the centering aid (40, 42) is pulled out through openings (48) in the motor housing (20, 30).

3 Claims, 4 Drawing Sheets

METHOD OF ASSEMBLING AN ELECTRIC MOTOR

RELATED APPLICATION

This application is a divisional application of my application Ser. No. 09/410,182 filed Sep. 30, 1999 now abandoned, the entire contents of which is hereby incorporated by reference herein.

FIELD AND BACKGROUND OF THE INVENTION

The invention is concerned with a method of assembling an electric motor having a stator and a rotor as well as with an associated assembly tool.

The main component parts of electric motors are the rotor, which is usually seated on the motor shaft rotatably mounted in a housing, and the stator, which is fixed in a suitable way in the housing. In order not to hinder the rotational movement of the rotor, an air gap is necessary between the rotor and the stator. The smaller this air gap, the better the efficiency of the motor. However, the air gap cannot be made just as small as you like, since component tolerances and assembly tolerances have to be considered and therefore the air gap has to be chosen to be adequately large with sufficient certainty. In the assembly customary up to now, in which the parts are simply put together, it may happen that the component tolerances and the assembly tolerances add together and therefore relatively great positional tolerances of the parts in relation to one another occur overall, making a particularly wide air gap necessary.

SUMMARY OF THE INVENTION

It is the object of the invention to provide an assembly method for electric motors which makes possible a more accurate alignment of the stator with respect to the rotor and therefore allows the air gap to be made smaller.

The object is achieved according to the invention by a method in which, before during or after the insertion into one another of the rotor and the stator, a centering aid is introduced into the air gap between the rotor and the stator at at least three points distributed over the circumference, the rotor and the stator are subsequently fixed in their predetermined position in relation to one another in the envisaged way and finally the centering aid is pulled out through openings provided in the housing of the electric motor.

By assembling the centering aid at the same time as the electric motor is put together, an exact width of the air gap is ensured over the entire circumference, so that assembly tolerances, which were previously able to bring about a slightly eccentric position of the stator with respect to the rotor, are avoidable. It is also possible to a certain extent to provide compensation for tolerances of the components themselves. The new assembly method makes it possible to reduce the nominal size of the air gap, since only relatively small margins of certainty have to be taken into account when choosing the gap width, on account of the reduced tolerances. In addition to the possibility of reducing the width of the air gap and consequently improving the efficiency of the motor, the virtually constant gap width over the entire circumference is also of advantage for the properties of the motor.

For positional fixing, the stator is preferably braced between two housing halves, in which the motor shaft is mounted with the rotor seated on it. After the bracing of the housing halves, the stator can no longer change its position with respect to the rotor and the assembly aid can be removed. Since a dislodgement of the stator can no longer occur even before the centering aid is removed, it is possible to dispense with guiding surfaces for the stator in the housing halves that under certain circumstances were previously essential.

To achieve particularly accurate centering of the cylindrical inner surface of the stator with respect to the cylindrical outer surface of the rotor, it is advantageous to produce a force acting radially between the rotor and the stator at at least three points distributed around the circumference of the air gap when introducing the centering aid. As long as the rotor and the stator are not yet fixed in their position in relation to one another, these radial forces provide an exact concentric alignment of the stator in relation to the rotor. The radial forces between the rotor and the stator may be produced, for example, by flexible elements, belonging to the centering aid, between the rotor and the stator or by pushing spline elements, belonging to the centering aid, in between the rotor and the stator.

The invention also relates to an assembly tool for carrying out one of the methods described above. According to the invention, such a tool has, as a centering aid, at least three centering lugs, which are arranged in such a way that they can be introduced at least partially into the air gap of an electric motor to be assembled. For achieving a uniform gap width, at least three centering lugs are required, although of course it is possible for more centering lugs to be provided.

The exact alignment of the stator with respect to the rotor can be achieved by different designs of the centering lugs. A first possibility is to choose the thickness of the lugs such that the lugs are seated between the stator and the rotor essentially without any backlash. With such centering lugs, it is already possible to achieve considerable improvements in the accuracy of assembly.

Still better centering is achieved by means of lugs which are capable of building up in the air gap a radial force acting between the stator and the rotor. This can be achieved, for example, by the centering lugs being designed as radially resilient elements which can be pushed under stress between the rotor and the stator. Since the force acts at points distributed evenly over the circumference, the stator assumes a concentric position with its cylindrical inner surface with respect to the cylindrical outer surface of the rotor.

Instead of the resilient elements, the centering lugs may have at their free ends spline surfaces which allow the ends of the lugs to be clamped between the stator and the rotor. An exact alignment of the stator with respect to the rotor is also possible with the aid of such spline elements.

BRIEF DESCRIPTION OF THE DRAWINGS

Exemplary embodiments of the invention are discussed in more detail below with reference to the attached drawings, in which.

DETAILED DESCRIPTION OF THE PREFERRED EMBODIMENT

Figure 1:
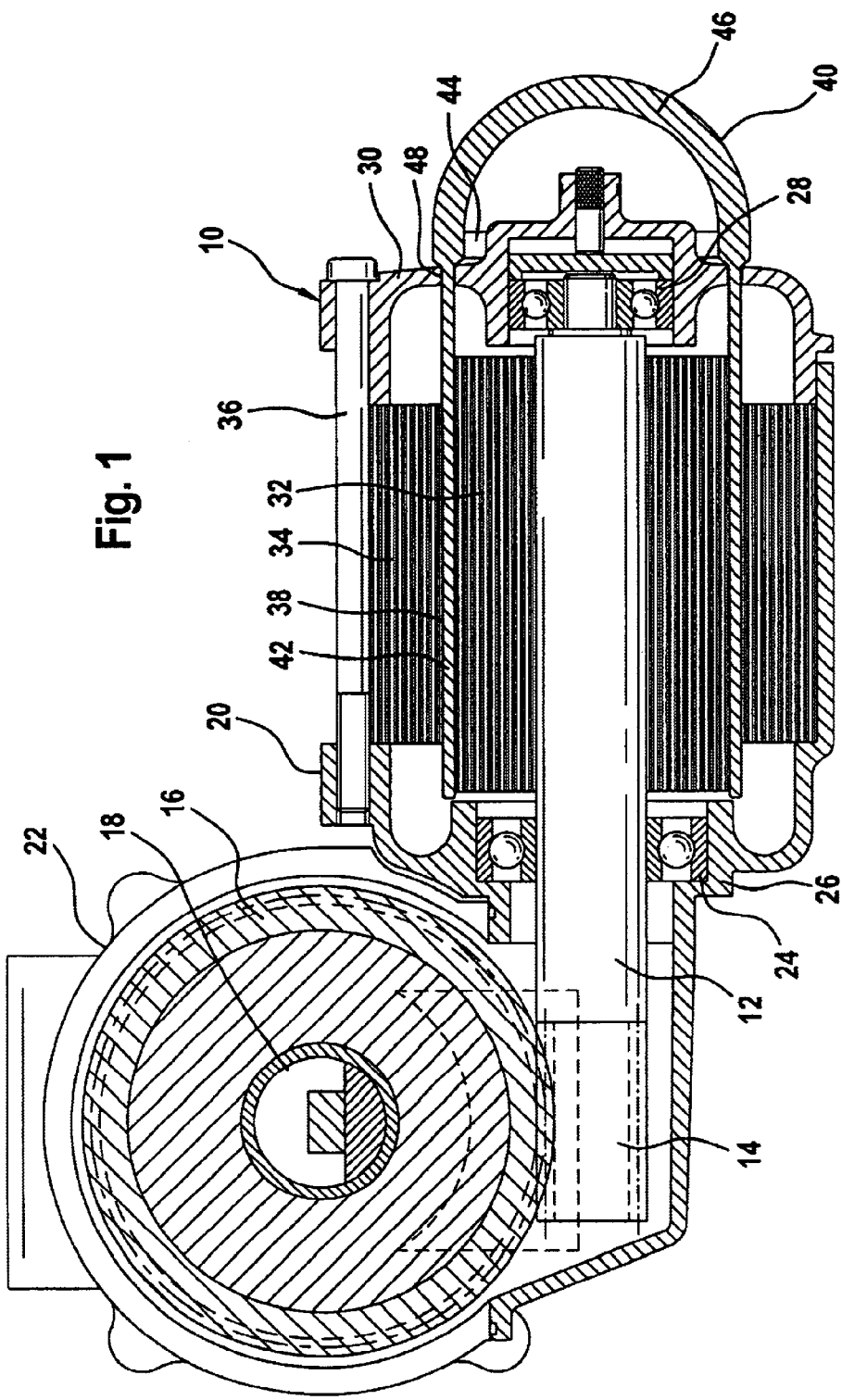
FIG. 1 shows a longitudinal section through an electric motor of an electrical steering booster with an assembled centering aid.

Represented in FIG. 1 is an electric drive motor 10, which drives via a worm 14 formed on its motor shaft 12 a worm wheel 16, which is seated on the steering column of a motor vehicle. The electric drive motor 10 consequently serves as an electrical steering booster for a vehicle steering system.

The motor 10 has a housing 20, which is flange-mounted onto a housing 22 of the steering gear. The motor shaft 12 is mounted with a first antifriction bearing 24 in a first housing half 26 and with a second antifriction bearing 28 in a second housing half, designed as the housing cover 30. Seated on the motor shaft 12 is a rotor 32, which is constructed in the customary way from stacks of sheets and permanent magnets.

Arranged concentrically around the rotor 32 is a wound stator 34, which is accommodated in the first housing part 26 and is clamped with the aid of tightening screws 36 between the housing cover 30 and the first housing part 26.

Figure 2:
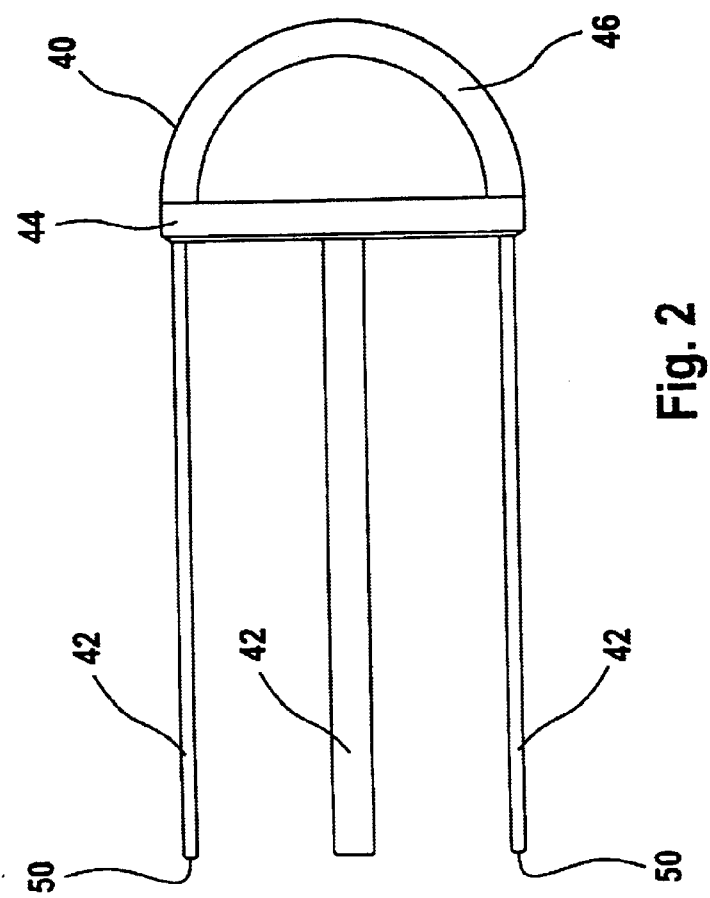
FIG. 2 shows a view of the centering aid according to FIG. 1.

An air gap 38 is provided between the cylindrical inner surface of the stator 34 and the cylindrical outer surface of the rotor 32. It is endeavored to keep the width of this air gap 38 as small as possible, since a small gap width is synonymous with good efficiency of the motor. To be able to provide as narrow an air gap 38 as possible in spite of unavoidable component tolerances, a centering aid 40, which in the example represented has four centering lugs 42 (see also FIGS. 2 to 4), is used as an assembly tool for putting the parts together. For stabilization, the centering lugs 42 are formed onto or are fastened to a ring part 44, which has a grip 46. With the centering aid 40 assembled, the ring part 44 and the grip 46 are outside the gear housing 20, while the centering lugs 42 protrude through openings 48 in the housing cover 30 into the air gap 38.

Figure 3:
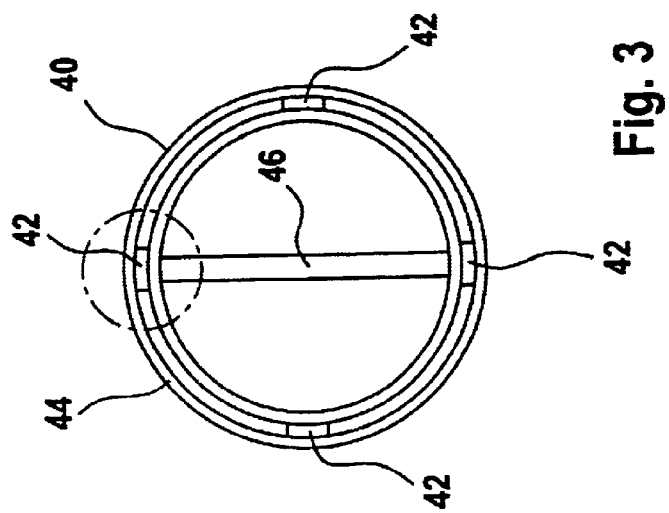
FIG. 3 shows an end-on view of the centering aid according to FIG. 2.
Figure 4:
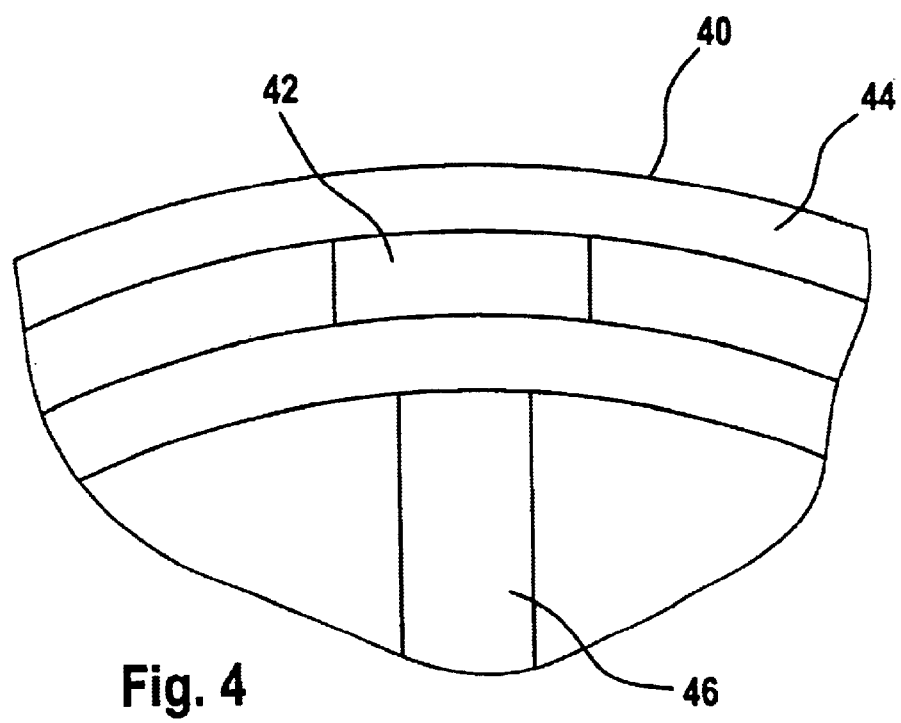
FIG. 4 shows a view of a detail from FIG. 3.

It can be seen from FIGS. 3 and 4 that the centering lugs 42 have cross sections in the form of ring segments, the radial width being chosen such that the centering lugs 42 can be introduced into the air gap 38 with little backlash. Too small a radial width of the centering lugs 42 worsens the assembly tolerances, while a thickness chosen to be too large makes assembly more difficult or may even lead to jamming of the centering lugs between the stator 34 and the rotor 32. The free ends 50 of the centering lugs 42 may be provided with a bevel or a radius in order to facilitate the insertion of the centering aid 40 into the air gap 38.

With the tightening screws 36 not yet tightened, the centering aid 40 avoids dislodgement of the stator 34, not yet finally fixed with respect to the motor housing 20, in relation to the rotor 32, which in view of unavoidable additional component tolerances may lead to the stator 34 and the rotor 32 coming into contact during subsequent operation. After the tightening of the tightening screws 36, the stator is finally fixed in the radial direction with respect to the rotor 32, so that the centering aid 40 can be removed. This takes place by simply pulling the centering lugs 42 out through the openings 48 in the housing cover 30. With the aid of the centering aid 40, it is possible, for example, for gap widths of 0.2 mm to be realized without any problem.

Figure 5:
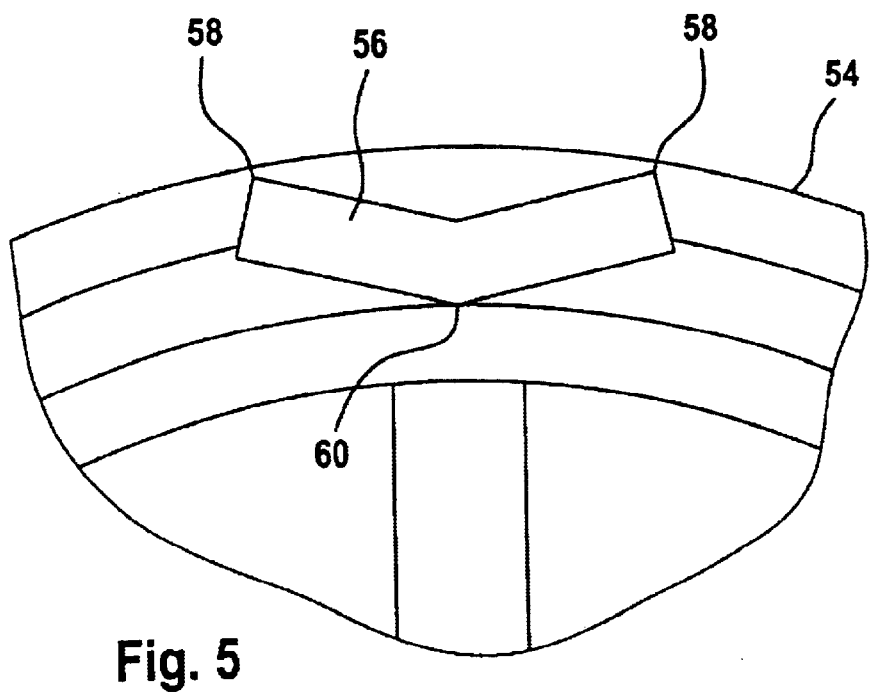
FIG. 5 shows a view of a detail of a centering aid with resilient centering lugs.

FIG. 5 shows a view of a detail of a further embodiment of a centering aid 54, which has centering lugs 56, which have in cross section V-shaped angular cross sections. The leg ends 58 of the centering lugs 56 in this case point radially outward, while the central tip 60 of the angle profile is directed radially inward. The centering lugs 56 consist of a flexibly compliant material, for example spring steel. The geometry of the centering lugs 56 is chosen such that the leg ends 58 have in the radial direction a distance from the tip 60 of the angle profile which is greater than the chosen gap width. When the centering lugs 56 are introduced between the cylindrical inner surface of the stator 34 and the cylindrical outer surface of the rotor 32, an elastic deformation of the centering lugs 56 consequently occurs, as a result of which radially acting forces are built up between the surfaces. Since a plurality of centering lugs 56, distributed evenly over the circumference, are provided, the radial forces produced lead to an exact concentric alignment of the stator with respect to the rotor.

Figure 6:
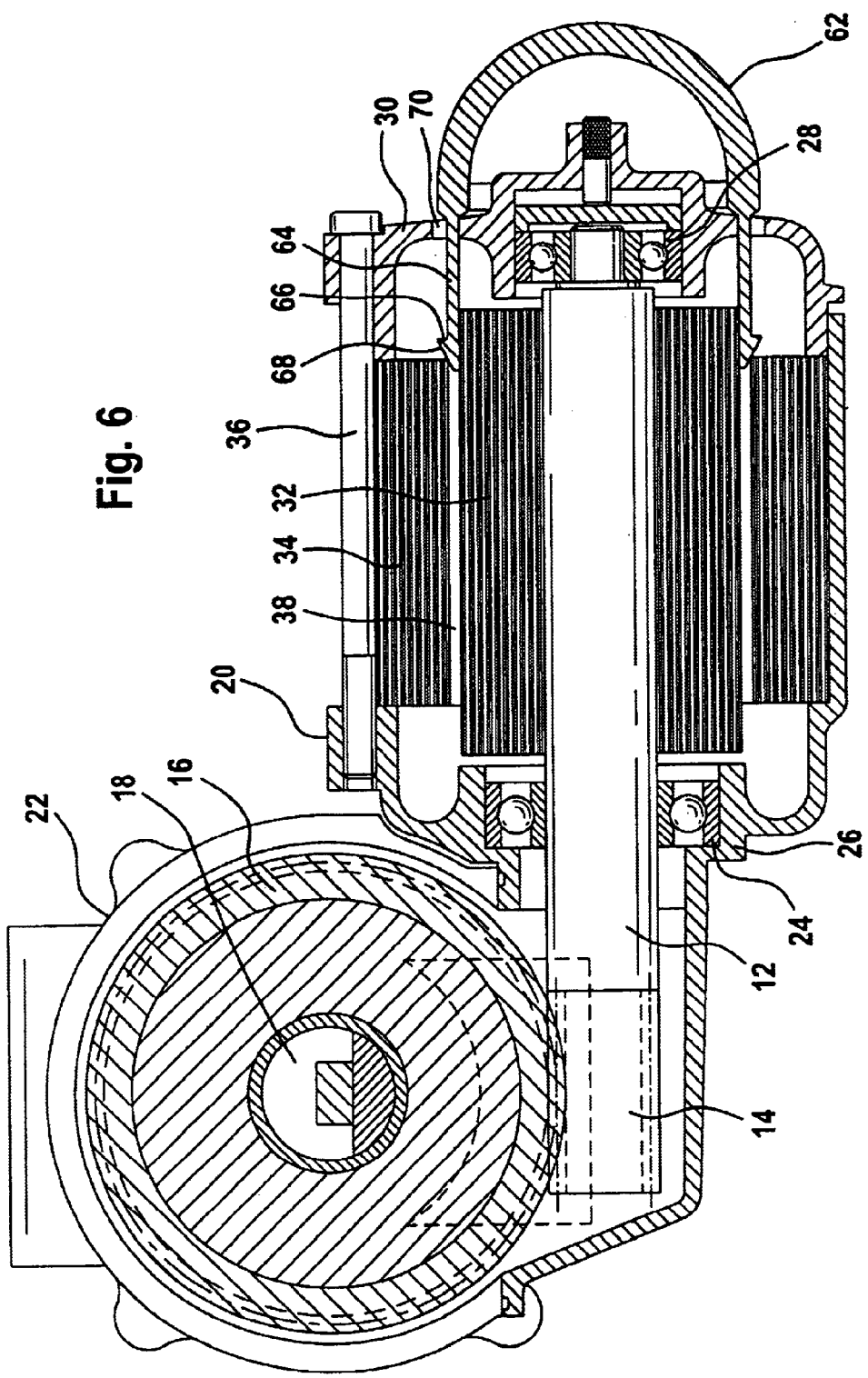
FIG. 6 shows a longitudinal section corresponding to FIG. 1 with a further embodiment of a centering aid.

Represented in FIG. 6 is a further centering aid 62 in the assembled state, the centering lugs 64 of which have at their ends spline elements 66, which bear on their inner side against the cylindrical outer surface of the rotor 32, and have on their outer sides a spline surface 68, which is pressed against the front edge of the cylindrical inner surface of the stator. In this case as well, radial forces which lead to exact centering act between the rotor 32 and the stator 34 at a plurality of points distributed over the circumference.

The spline elements 66 have a greater radial width than the air gap 38, so that correspondingly larger openings 17 are provided in the housing cover 30 in order to ensure unproblematical pulling out of the centering lugs 64 with the spine elements 66.

The procedure described above in conjunction with the assembly of electric motors, for ensuring exact positioning between a stator and a rotor by means of a centering aid, can in principle also be used for the alignment of other parts rotating in relation to one another. It does not matter whether one part or both parts are rotatably mounted.

List of designations:
- 10 Drive motor
- 12 Motor shaft
- 14 Worm
- 16 Worm wheel
- 20 Housing
- 22 Gear housing
- 24 Antifriction bearing
- 26 First housing half
- 28 Motor shaft bearing (second antifriction bearing)
- 30 Housing cover
- 32 Rotor
- 34 Stator
- 36 Tightening screws
- 38 Air gap
- 40 Centering aid
- 42 Centering lugs
- 44 Ring part
- 46 Grip
- 48 Openings
- 50 Free ends
- 54 Centering aid
- 56 Centering lugs
- 58 Leg ends
- 60 Tip
- 62 Centering aid 64 Centering lugs
66 Spline elements
68 Spline surface
70 Openings

What is claimed is:

1. A method of assembling an electric motor (10) comprising the steps of: inserting a stator (34) and a rotor (32) one into another, before, during or after introducing a centering aid (62) at at least three points distributed on a circumference of an air gap between said rotor (32) and said stator (34), producing radially acting forces at said at least three points between said rotor (32) and said stator (34) when introducing the centering aid (62);

subsequently fixing a predetermined portion of said stator (34) relative to said rotor (32); and finally pulling out the centering aid (62) through openings (70) provided in a housing (30) of said electric motor (10), wherein the radial forces are produced by wedge elements (66, 68) belonging to said centering aid (62), each of said wedge elements bearing on its inner side against a cylindrical surface of said rotor (32) by pressing a wedge surface (68) of the wedge element against a front edge of a cylindrical inner surface of said stator (34), wherein the wedge elements (66) have a greater radial width than the air gap (38).

2. The method as claimed in claim 1, wherein, for positional fixing, the stator (34) is braced between two housing halves (26, 30), in which a motor shaft (12) is mounted with the rotor (32) seated thereon.

3. The method as claimed in claim 1, wherein said radial forces are produced by flexible elements (56), belonging to the centering aid (54), between said rotor (32) and the stator (34).

* * * * *